No. 898,213. PATENTED SEPT. 8, 1908.
A. H. C. GIBSON.
PRESSURE INDICATOR.
APPLICATION FILED NOV. 16, 1905.
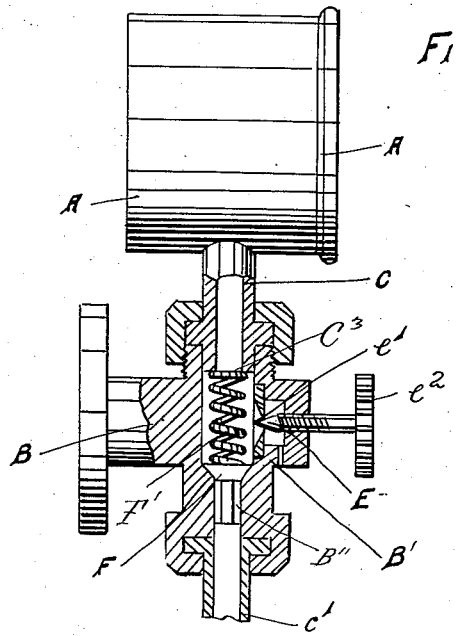
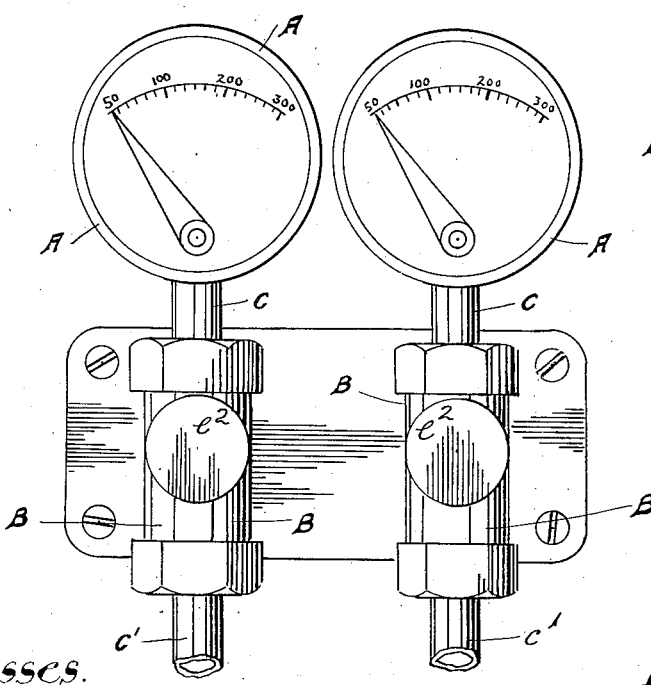
Fig. 1.
Fig. 2.
Witnesses.
Inventor.
Arthur H. C. Gibson

UNITED STATES PATENT OFFICE.

ARTHUR HUGO C. GIBSON, OF BIRMINGHAM, ENGLAND.

PRESSURE-INDICATOR.

No. 898,213.

Specification of Letters Patent.

Patented Sept. 8, 1908.

Application filed November 16, 1905. Serial No. 287,578.

*To all whom it may concern:*

Be it known that I, ARTHUR HUGO C. GIBSON, a subject of the Kingdom of Great Britain, residing at Bridge street, Birmingham, in the county of Warwick, England, electrical engineer, have invented a certain new and useful Pressure-Indicator, (for which I have obtained Letters Patent in Great Britain, Patent No. 101, dated January 3, 1905,) of which the following is a specification.

This invention relates to the class of apparatus and means for examining and gaging the conditions within the cylinders or other parts of mechanisms of any description, which mechanisms are concerned in the utilization or development of pressure or in the use of the expansive qualities of liquids or gases under pressure, and whereby the pressure or variation of pressure of the liquids or gases in the cylinder is indicated and can readily and constantly be ascertained in the ordinary course of the engine's work, thus in the case for example of internal combustion engines used for motor cars, enabling the driver of a car to immediately discover and locate a fault without having to stop the car and test for it in the usual manner. By this invention the use of a bypass in such apparatus is dispensed with and the return pressure gas from the indicator is exhausted into the external atmosphere, for the purpose of preventing it meeting with the incoming pressure on the cylinder side of the valve.

In order that this invention may be clearly understood and more easily carried into practice, I will proceed to describe my invention as applied to the cylinders of an internal combustion engine as used for automobiles and from which its more general application will be readily understood.

Figure 1 is a diagram sectional elevation of my apparatus. Fig. 2 is a front elevation of the arrangement illustrated by Fig. 1 and which is shown applicable for a two cylinder engine.

Like letters of reference refer to like parts throughout the specification and drawings.

In carrying out my invention I employ any suitable pressure gage or gages equal in number of cylinders or pressure containing vessels of the mechanism to be tested. Each pressure gage A is connected to the cylinder or pressure containing vessel by means of a tube or pipe C C' and suitable unions so that any pressure within the vessel will be communicated to the gage A. Interposed between the tubes or pipes C and C' is a tee piece B comprising a valve body B' having an inlet port B" connected with the pipe C' leading to the cylinder, and, an outlet port C³ connected with the pipe C leading to the gage A. Closing the inlet port is a check valve F held against its seat by a counter-balancing spring F'. The gases pass through the inlet port B" from the cylinder of the engine to the gage A. In the valve body B' between the check valve F and the gage A is an orifice e' which may be regulated in extent by the screw valve E for the purpose of allowing the gas to escape from the valve body to the external atmosphere and prevent the return, and the incoming, pressure from meeting on the gage side of the check valve F.

Any pressure or succession of pressure within the cylinder or pressure containing vessel will be communicated to the gage and the pressure within the gage will then be able to gradually leak away through the orifice e'.

It will readily be seen that if for example the four cylinders of an internal combustion engine are connected to four of my apparatus then any difference of the pressures generated in the several cylinders will become apparent on the gage corresponding with that cylinder.

The screw down part of the valve E may be so marked as to enable the screw $e^2$ to be readily adjusted for the required escape of leakage of the gas.

My invention may be varied so as to enable me to apply it to the various requirements to be met with, without departing from the general principle of my invention.

What I claim as new, and desire to secure by Letters Patent is:—

In a pressure indicator the combination of, a gage, a fluid containing chamber connected with the gage, a fluid supply pipe for the chamber, a non-return valve for the chamber, and a spring for the non-return valve of sufficient strength to prevent the passage of the pressure fluid into the fluid chamber until a predetermined pressure is reached, with, a second chamber, a partition between the second chamber and the first mentioned chamber having an orifice therein, an adjustable valve mounted in the outer wall of the second chamber to regulate the size of the orifice, and an outlet from the second mentioned chamber to the atmosphere.

In witness whereof I have hereunto set my hand in the presence of two witnesses.

ARTHUR HUGO C. GIBSON.

Witnesses:
WALKER A. E. BARTLAM,
JUSTUS JONES.